Jan. 30, 1934.    W. W. KELLY    1,945,196
NUT WARMER
Filed March 23, 1932    6 Sheets-Sheet 4

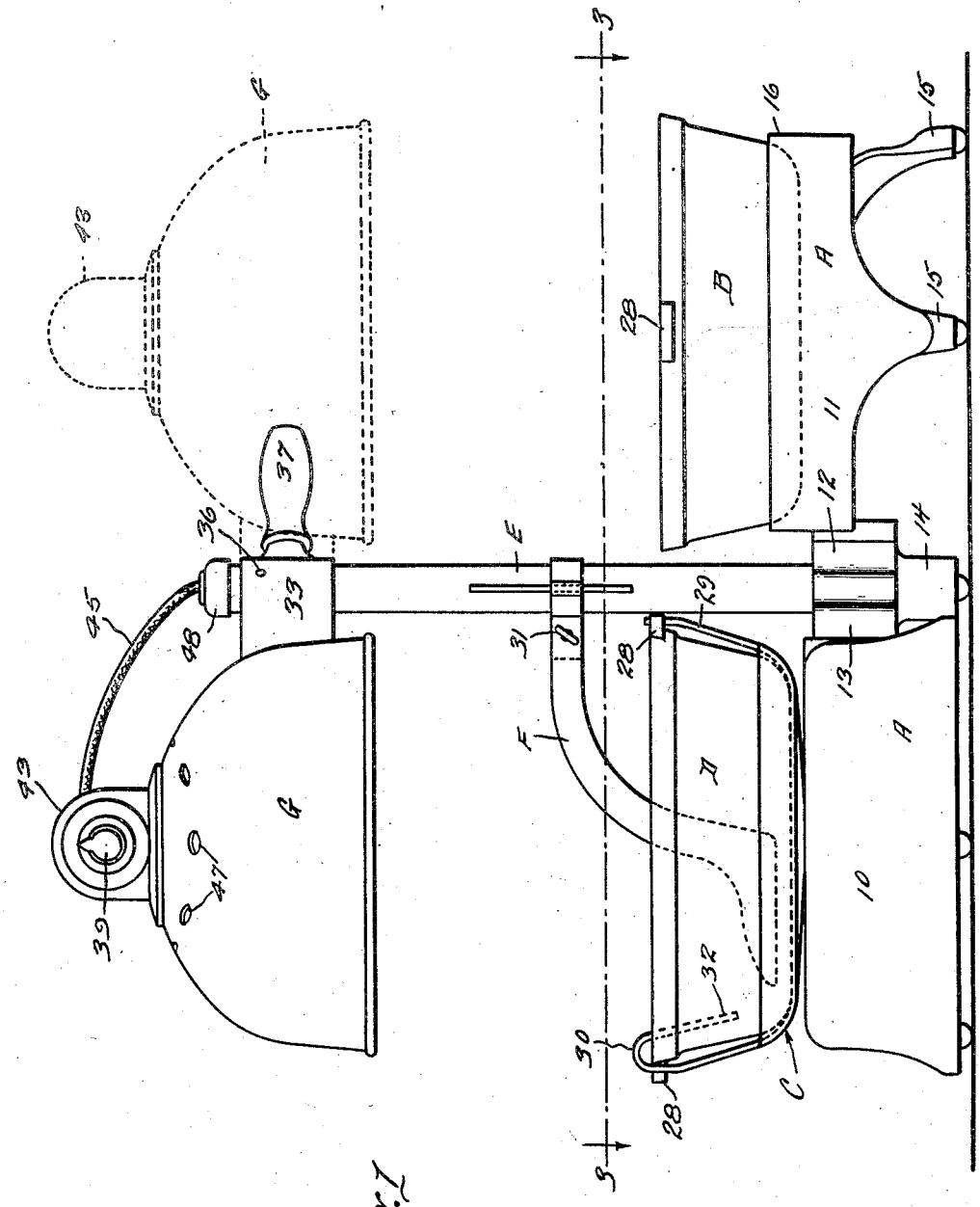

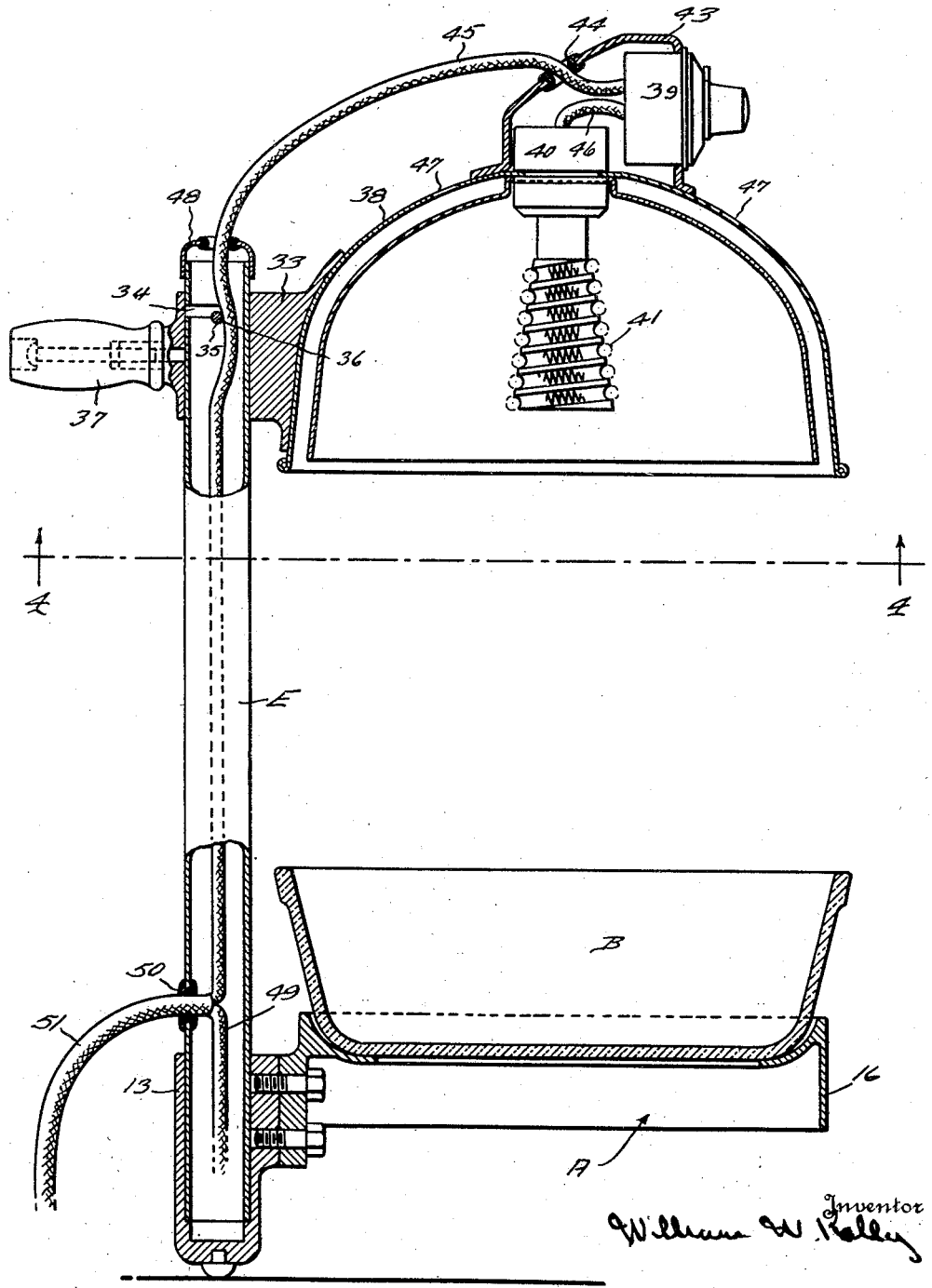

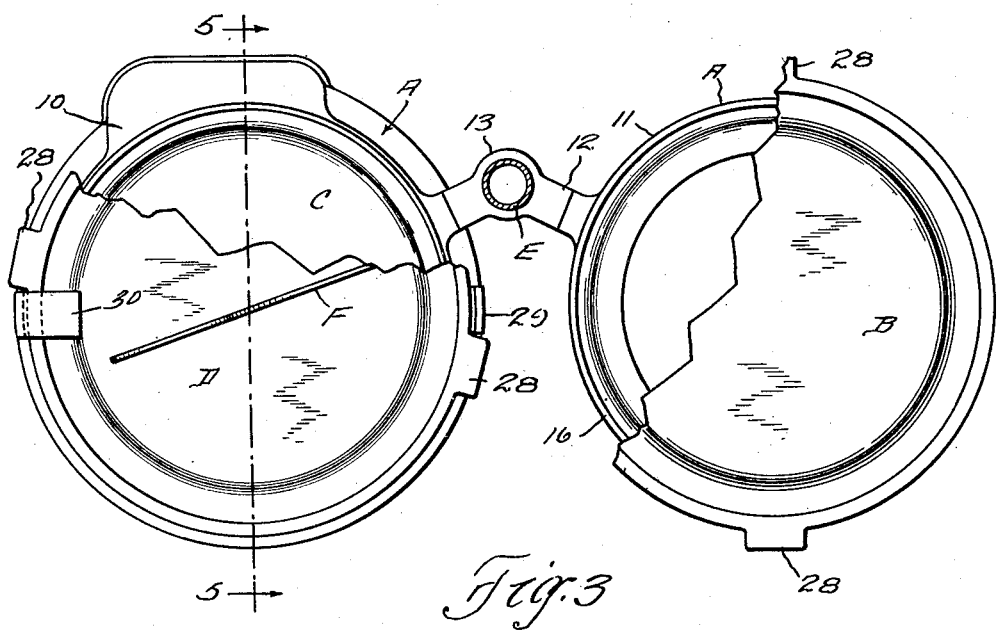
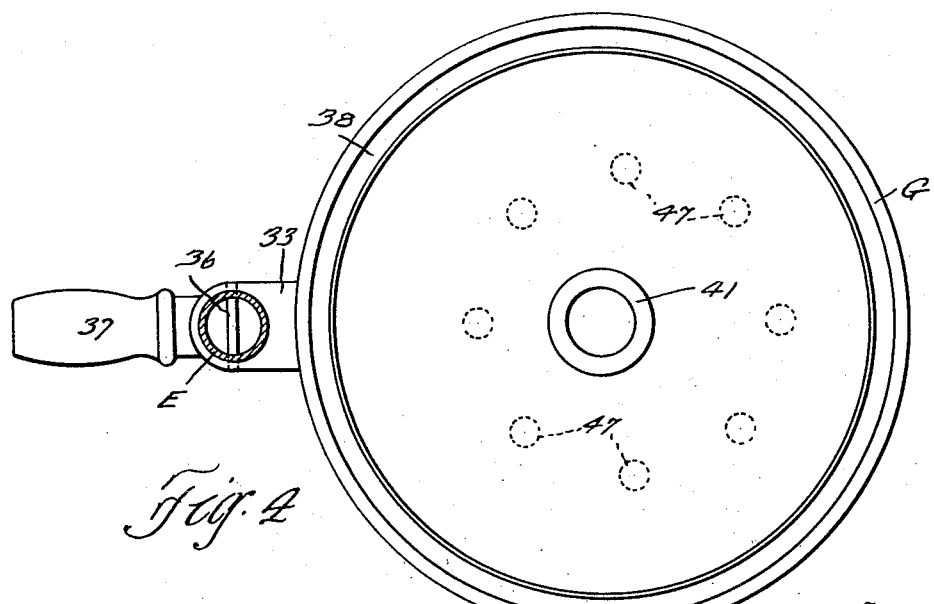

Inventor
William W. Kelly
By Hull Brock & West
Attorney

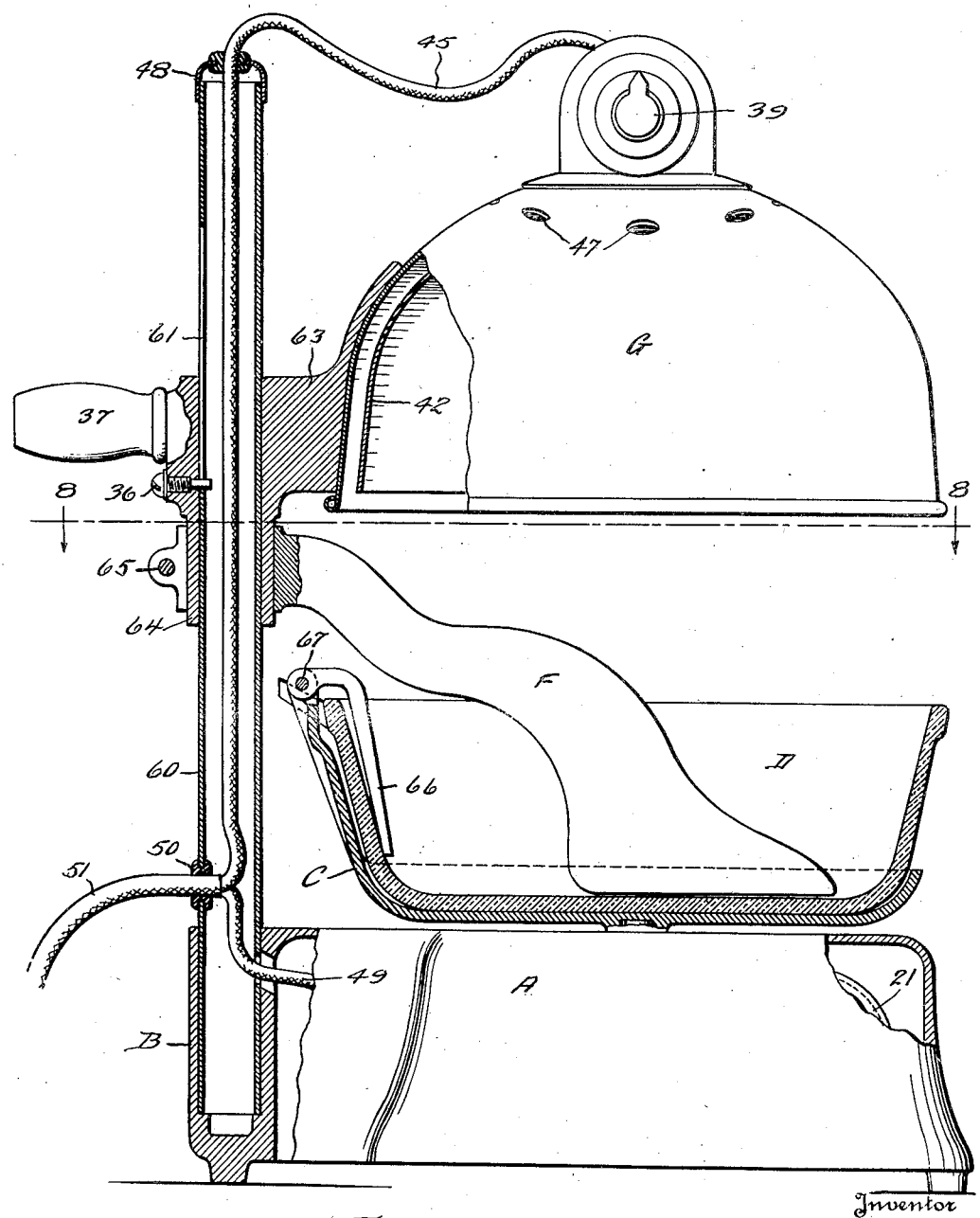

Jan. 30, 1934.  W. W. KELLY  1,945,196
NUT WARMER
Filed March 23, 1932  6 Sheets-Sheet 6
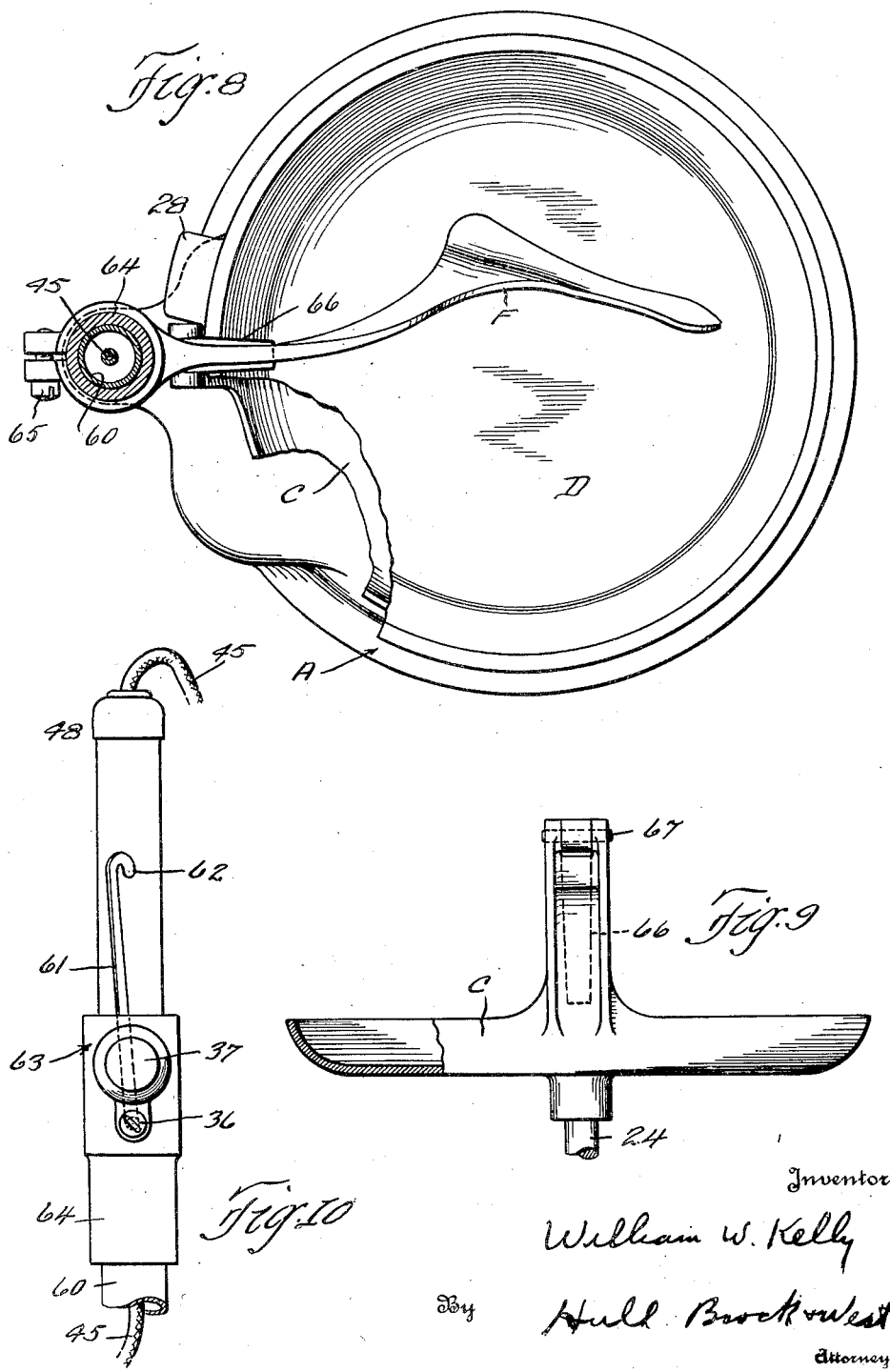

Patented Jan. 30, 1934

1,945,196

UNITED STATES PATENT OFFICE 1,945,196

NUT WARMER

William W. Kelly, Cleveland Heights, Ohio

Application March 23, 1932. Serial No. 600,713

6 Claims. (Cl. 34—21)

This invention relates to a combined displaying and toasting device for nuts or similar food products.

An object of the invention is to provide such a device which is adapted for toasting or warming such food products while effectively exhibiting them and to facilitate the warming or the beginning of toasting of one receptacle of such food while the other is being toasted or while butter or similar seasoning is being added thereto. A further object is the provision of a pair of upwardly facing receptacles together with a heater which can be swung selectively to a position directly above either. A further object is the provision of means for rotating a receptacle and a reflector type heater swingable to and from a position directly above the same. A further object is the provision of a novel form of agitator for nuts or similar food products contained within a rotating receptacle while the same is being subjected to heat from a reflector type heater positioned thereabove.

Figure 5:
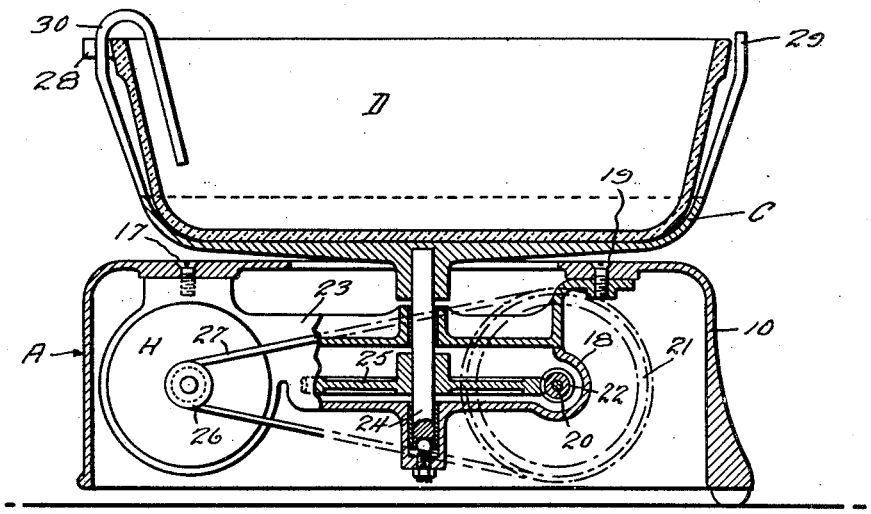
Figure 6:
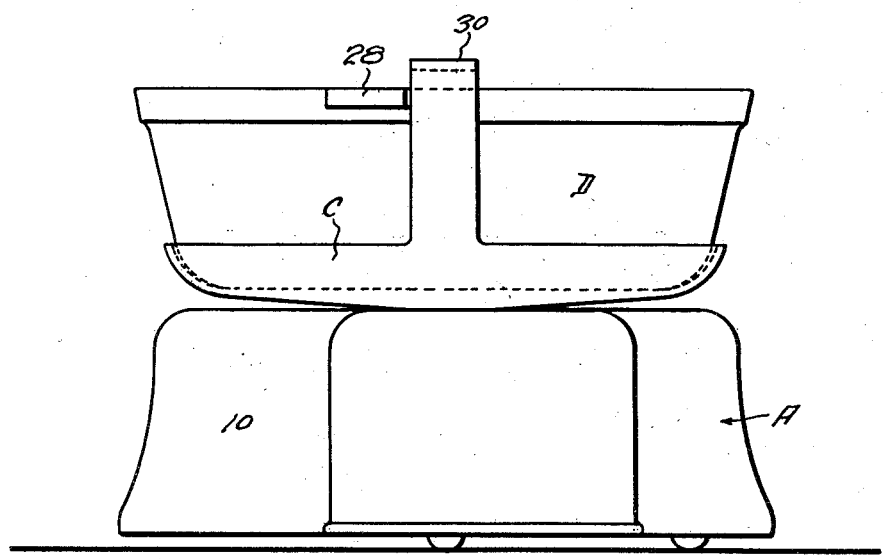

Other and more limited objects will appear from the following description when taken in connection with the accompanying drawings in which Fig. 1 is a front elevation of the preferred embodiment of my invention showing the alternate position of the heater in dotted lines; Fig. 2 is an enlarged fragmentary sectional view showing one of the receptacles together with the heater and its supporting post; Fig. 3 is a section on line 3—3 of Fig. 1; Fig. 4 is a section on line 4—4 of Fig. 2; Fig. 5 is a section on line 5—5 of Fig. 3 showing the motor and pulley in elevation and the driving belt partly in elevation, the remainder of the belt and the pulley driven thereby being shown in phantom view; Fig. 6 is a fragmentary end elevation looking toward the right in Fig. 1; Fig. 7 is a view similar to Fig. 2 but showing a modified form; Fig. 8 is a section on the line 8—8 of Fig. 7; Fig. 9 is a fragmentary elevation of the rotatable receptacle carrying member constructed as in Fig. 7 and Fig. 10 is a fragmentary elevation showing the upper portion of the upright or post shown in Fig. 7 with the member which telescopes thereon and carries the heating element.

Referring now to the accompanying drawings, the numeral A indicates generally a base or support including a depression adapted to receive one receptacle B and a rotatable socket portion C adapted to support a second receptacle D. Upstanding from the base or support A is a post E which adjustably carries a fixed agitator F and swingably or shiftably carries a reflector type heater G. Within the portion of the base which carries the receptacle D is an electric motor H which drives through suitable reduction gearing the socket C for rotating the receptacle D. Nuts to be toasted will be placed in the receptacle D and the motor H set into operation. The agitator F will be moved to the position shown in Fig. 1 while the heater G is moved to a position directly above the receptacle D. The receptacle D being glass and the heater G being positioned a considerable distance thereabove, the machine will now effectively display as well as toast the nuts or similar food material in the receptacle D. When it is found desirable to remove material from the receptacle or to remove the heat to prevent overheating or for the addition of seasoning, the heater G can readily be swung to a position over the receptacle B thereby applying heat to the nuts or similar food material therein.

The base A consists of two principal parts, the part 10 which includes a housing for the motor and reduction gearing and supports the receptacle D and the portion 11 which supports the receptacle B. These are connected by a web 12 provided with a central enlargement 13 in which is anchored the upstanding post E. A foot 14 directly underneath the portion 13 forms additional reinforcement for the support of the post E. The base portion 11 is provided with legs 15 and a receptacle support 16 having a depression occupying most of the top thereof and adapted to receive the bottom of the receptacle B. The portion 10 comprises a housing or skirt within which is mounted the motor H by means of a screw 17 and bearing means 18 by means of a screw 19. Mounted within the bearing means 18 is a shaft 20 which carries a pulley 21 and a worm 22. A web 23 extends between the motor casing and a portion 18 and carries journals for a shaft 24 upon which is non-rotatably mounted a worm gear 25. A bearing of usual construction is provided at the lower end of the shaft 24 for supporting the same together with the socket C. Mounted on the motor shaft is a pulley 26 which drives the pulley 21 through a belt 27. The motion of the pulley 21 is transmitted in reduced ratio through the worm 22 and worm gear 25 to the shaft 24, socket C and receptacle D. The receptacles are provided with ears 28 and the socket portion C is provided with means 29 and 30 adapted to engage said ears for ensuring that the receptacle will be rotated.

Connected to the post E by being bent therearound and provided with a clamping nut 31 is an agitator F which extends into the receptacle D adjacent to but spaced from the bottom thereof. As is clear from the drawings, this agitator is positioned substantially entirely at one side of the center of the receptacle D. The socket portion C is provided with a bent-over extension 32 which also extends into the receptacle D to a point adjacent the end of the agitator F. This extension cooperates with the agitator to prevent excessive piling up of the nuts against the side of the receptacle D and aids materially in securing thorough agitation.

Received on the upper end of the post E is a projecting portion 33 of the heater G. This portion has an opening snugly receiving the upper end of the post. Formed in the post is a slot 34 having depressions 35 at the ends thereof. Carried by the portion 33 is a pin 36 which extends into the slot 34 and prevents sliding of the portion with respect to the post while allowing a limited rotating or swinging motion. The depressions 35 tend to hold the heater yieldably in position over either of the receptacles, the position of the depressions being so selected that the heater will, when the pin is in one of them, be positioned directly over one of the receptacles. A handle 37 is fixedly attached to the portion 33 to facilitate swinging the heater. Connected to the portion 33 is a shield 38 carrying a switch 39, a socket 40 or a heating element 41 and a reflector 42 which is connected thereto by being confined between the two portions of the socket 40, as clearly indicated in the drawings. The switch 39 is mounted by means of a switch housing 43 which is provided with an opening 44 for the reception of an electric cable 45. A cable 46 passes from the switch 39 to the socket 40. The switch 39 and the remaining part of the electric circuit may be so designed as to provide for varying degrees of energization of the heating element whereby to vary the intensity of the heat. The shield 38 is provided with a series of openings 47 for allowing the escape of heated air from between the same and the reflector 42 whereby to maintain said shield relatively cool so that there is no danger of an operator being burned. The cable 45 may extend through an opening in a cap 48 into the interior of the post E joining the cable 49 which supplies current to the motor and emerging from the post at the point 50 from post E as cable 51 which may be provided with a suitable plug adapted for connection to a source of current.

Referring now to the modification disclosed in Figs. 7 to 10 inclusive, the numeral 10 indicates generally the base within which is housed the mechanism for rotating the table which carries the receptacle D. (The numerals which indicate parts of this modification of the same construction as the corresponding parts in the modification of Figs. 1 to 6 are indicated by the same reference characters). Secured to and upstanding from the member 13 of the base A is a post 60 differing from the post E essentially in that a slot 61 of the peculiar shape best shown in Fig. 10 is provided for the purpose of enabling the heating element G to be elevated, rotated and supported in such position by reason of the engagement of the pin 36 in the backwardly extending portion 62 of the slot 61. It will be noted that the member 63 of the heating element G differs from the element 33 of the modification of Fig. 2 in that it has a depending skirt 64 to which the agitator F is clamped by set screw 65. Obviously the agitator will be elevated with the heating element and thereby moved clear of the receptacle D by the same operation which moves the heater out of obstructing position. It will be noted that in this modification the pin 36 has been shown immediately beneath the handle 37 instead of at a position spaced therefrom by 90°.

The auxiliary stirring member 66 which corresponds to the portion 32 is pivoted at 67 to the rotating member C for more convenient removal of the receptacle D.

While I have shown and described the present preferred embodiment of my invention, I do not wish to be restricted to the details thereof except in accordance with the scope of the appended claims and the requirements of the prior art.

Having thus described my invention, what I claim is:

1. In a device of the class described, a base, a receptacle supporting member, means carried by said base for rotating said member, a normally fixed agitator extending to a position within a receptacle supported by said member, means for supporting said agitator, and an auxiliary agitator pivotally connected to said member and adapted to occupy a position within said receptacle.

2. In a device of the class described, a base, a receptacle rotatably supported thereon, a post upstanding from said base, a heating element having a portion slidably connected to said post, means for positioning said heating element at a predetermined position with respect to said post, and an agitator carried by said heating element.

3. In a device of the class described, a base, a post upstanding from said base, a heating element having a portion telescoping said post, means for positioning said heating element at a predetermined position with respect to said post, and an agitator carried by said heating element, and angularly adjustable with respect thereto.

4. In a device of the class described, a base, a receptacle supporting member rotatably mounted upon said base, means for rotating said member, a receptacle supported on said member, a post upstanding from said base, a heating means having a portion telescoping said post and movable up and down thereon, means carried by said last mentioned portion and adapted to engage said post to position said heating element selectively in a plurality of positions, a depending skirt carried by said portion and an agitator clamped to said skirt and extending into said receptacle.

5. In a device of the class described, a base, a receptacle supporting member rotatably mounted upon said base, means for rotating said member, a receptacle supported on said member, a post upstanding from said base and having an inverted J-shaped slot therein, a heating means having a portion telescoping said post and movable up and down thereon, a pin carried by said last mentioned portion and engaging in said slot to position said heating element selectively in a plurality of positions, a depending skirt carried by said portion and an agitator clamped to said skirt and extending into said receptacle.

6. In a device of the class described, a base, a receptacle supporting member rotatably mounted upon said base, means for rotating said member, a receptacle supported on said member, a post upstanding from said base and having an inverted J-shaped slot therein, a heating means having a portion telescoping said post and movable up and down thereon, a pin carried by said last mentioned portion and engaging in said slot to position said heating element selectively in a plurality of positions, and an agitator carried by said heating element and extending into said receptacle.

WILLIAM W. KELLY.